United States Patent
Yu et al.

(10) Patent No.: US 12,019,987 B1
(45) Date of Patent: Jun. 25, 2024

(54) SYSTEMS AND METHODS FOR FLEXIBLE REGULARIZED DISTILLATION OF NATURAL LANGUAGE PROCESSING MODELS TO FACILITATE INTERPRETATION

(71) Applicant: Wells Fargo Bank, N.A., San Francisco, CA (US)

(72) Inventors: Ye Yu, Fujian (CN); Harsh Singhal, San Francisco, CA (US); Wayne B. Shoumaker, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 543 days.

(21) Appl. No.: 17/302,261

(22) Filed: Apr. 28, 2021

(51) Int. Cl.
  *G06F 40/284* (2020.01)
  *G06N 5/04* (2023.01)
  *G06N 20/00* (2019.01)

(52) U.S. Cl.
  CPC ............. *G06F 40/284* (2020.01); *G06N 5/04* (2013.01); *G06N 20/00* (2019.01)

(58) Field of Classification Search
  None
  See application file for complete search history.

(56) References Cited

U.S. PATENT DOCUMENTS 11,151,480 B1 * 10/2021 Golovidov ............ G06F 16/904
2016/0155136 A1    6/2016 Zhang et al.
2018/0158552 A1    6/2018 Liu et al.
2020/0226476 A1    7/2020 Wang et al.
2021/0248503 A1 *  8/2021 Hickey ............... G06F 18/2113
2023/0162005 A1 *  5/2023 Cheng .................... G06N 3/045
                                                    706/15

FOREIGN PATENT DOCUMENTS

WO    WO-2022177581 A1 *  8/2022

OTHER PUBLICATIONS

Kevin J Liang, Weituo Hao, Dinghan Shen, Yufan Zhou "MIXKD: Towards Efficient Distillation of Large-Scale Language Models" arXiv:2011.00593v2 [cs.CL] Mar. 17, 2021 (Year: 2021).*

(Continued)

*Primary Examiner* — Richemond Dorvil
*Assistant Examiner* — Alexander G Marlow
(74) *Attorney, Agent, or Firm* — K&L Gates LLP

(57) ABSTRACT

Systems, apparatuses, methods, and computer program products are disclosed for distillation of a natural language processing model. An example method includes receiving, by communications circuitry, a set of text data comprising a set of observations and predicting, by processing circuitry and using the NLP model, classifications for each observation in the text data. The example method further includes generating, by model training engine, a balanced sampled data structure based on the predicted classifications for each observation in the text data and training, by the model training engine, a surrogate model using the balanced sampled data structure. The example method further includes identifying, by an interpreter and from the surrogate model, a set of most-influential tokens in the text data.

20 Claims, 9 Drawing Sheets

(56) References Cited

OTHER PUBLICATIONS

Geoffrey Hinton, Oriol Vinyals, Jeff Dean "Distilling the Knowledge in a Neural Network" arXiv:1503.02531v1 [stat.ML] Mar. 9, 2015 (Year: 2015).*

Scott M. Lundberg, Su-In Lee "A Unified Approach to Interpreting Model Predictions" arXiv:1705.07874v2 [cs.AI] Nov. 25, 2017 (Year: 2017).*

Jianping Gou, Baosheng Yu, Stephen J. Maybank, Dacheng Tao "Knowledge Distillation: A Survey" International Journal of Computer Vision https://doi.org/10.1007/s11263-021-01453-z (Year: 2021).*

Baccelli, Alessio, Knowledge distillation: a new approach towards LSTM interpretability, KTH Royal Institute of Technology, School of Electrical Engineering and Computer Science, Degree Project in Information and Communication Technology, Stockholm, Sweden 2019, 51 pages total.

Liu, Xuan et al., Improving the Interpretability of Deep Neural Networks with Knowledge Distillation, arXiv:1812.10924v1 [cs.LG] Dec. 28, 2018, 8 pages total.

Hahn, Sangchul et al., Self-Knowledge Distillation in Natural Language Processing, Proceedings of Recent Advances in Natural Language Processing, Varna, Bulgaria, Sep. 2-4, 2019, https://doi.org/10.26615/978-954-452-056-4_050, pp. 423-430.

\* cited by examiner

SYSTEMS AND METHODS FOR FLEXIBLE REGULARIZED DISTILLATION OF NATURAL LANGUAGE PROCESSING MODELS TO FACILITATE INTERPRETATION

BACKGROUND

Natural language processing (NLP) is the field of technology focused on how computers process and analyze natural language. Originally, NLP systems would utilize rules-based analysis of tokenized text data, although over time these systems gave way to natural language processing systems that leveraged statistical techniques to enhance accuracy. Modern NLP systems typically rely not only on statistical techniques, but often employ higher-dimensional and more complex machine learning techniques than in the past, often in multi-layered "deep learning" networks. Accordingly, where it is self-evident how rules-based systems would make decisions, modern deep learning systems operate in "black box" fashion, insofar as it is difficult to explain how or why such solutions render their solutions.

BRIEF SUMMARY

Financial institutions utilize NLP systems in a variety of ways. As one example, they use statistical modeling approaches to detect complaints or particular concerns raised during daily communication (e.g., customer emails, team member emails/messages, etc.). Whether in this domain or another, the modeling framework used in classification of such communication typically applies a contextual embedding matrix to convert each original text input (e.g., email content, IM message) into a numerical prediction vector, which in turn comprises the input for a model. The output of the model may then be a classification of the original text input into one or another category (e.g., a complaint or not a complaint).

One problem with this approach is that a model that takes text embeddings as input is not transparent (an embedding approach transforms each word (e.g., token) into a high dimensional prediction space, such that the contribution of each untransformed token to the output of the model will reflect the impact of the large number of dimensions in its transformed space, which cannot be easily mapped back to the original tokens and interpreted with existing methods). Because transparent models are preferred to ensure model accountability, a new approach is need to interpret NLP models that utilize high dimensional contextual embedding.

Systems, apparatuses, methods, and computer program products are disclosed herein for interpreting an NLP model. These solutions operate by scoring input data using the NLP model and generating a balanced sample of observations of different classifications that are produced by the NLP model. The balanced sampled data is then used to train an interpretable surrogate model (which may also be referred to as a distillation model). The trained surrogate model is then examined to identify the input tokens that have the most influence on the surrogate model's output. These identified tokens represent an approximation of the most important tokens of the original NLP model. The identified tokens are then outputted for review, providing important insight facilitating interpretability of the original NLP model.

In one example embodiment, a method is provided for distillation of an NLP model. The method includes receiving, by communications circuitry, a set of text data comprising a set of observations, and predicting, by processing circuitry and using the NLP model, classifications for each observation in the text data. The method further includes generating, by model training engine, a balanced sampled data structure based on the predicted classifications for each observation in the text data, and training, by the model training engine, a surrogate model using the balanced sampled data structure. The method further includes identifying, by an interpreter and from the surrogate model, a set of most-influential tokens in the text data.

In another example embodiment, an apparatus is provided for distillation of an NLP model. The apparatus includes communications circuitry configured to receive a set of text data comprising a set of observations, and processing circuitry configured to predict, using the NLP model, classifications for each observation in the text data. The apparatus further includes a model training engine configured to generate a balanced sampled data structure based on the predicted classifications for each observation in the text data, and train a surrogate model using the balanced sampled data structure. The apparatus further includes an interpreter configured to identify, from the surrogate model, a set of most-influential tokens in the text data.

In another example embodiment, a computer program product is provided for distillation of an NLP model. The computer program product includes at least one non-transitory computer-readable storage medium storing software instructions that, when executed, cause an apparatus to receive a set of text data comprising a set of observations, and predict, using the NLP model, classifications for each observation in the text data. The software instructions, when executed, further cause the apparatus to generate a balanced sampled data structure based on the predicted classifications for each observation in the text data, train a surrogate model using the balanced sampled data structure, and identify, from the surrogate model, a set of most-influential tokens in the text data.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for distillation of an NLP model to facilitate interpretation. As NLP systems have become more advanced, they have increasingly relied on more and more complex modeling techniques, which in turn has created an environment in which the way NLP systems operate is not transparent (e.g., understandable by humans). Because NLP systems are being used for more and more important tasks, the need to understand what is driving the decision-making of such systems has also increased; it is important not just to know the output from an NLP system, but also to understand why the system has produced that output. This need for interpretability increasingly manifests for businesses in the form of greater end-user skepticism, more rigorous model validation procedures, and increased regulatory oversight.

Figure 3:
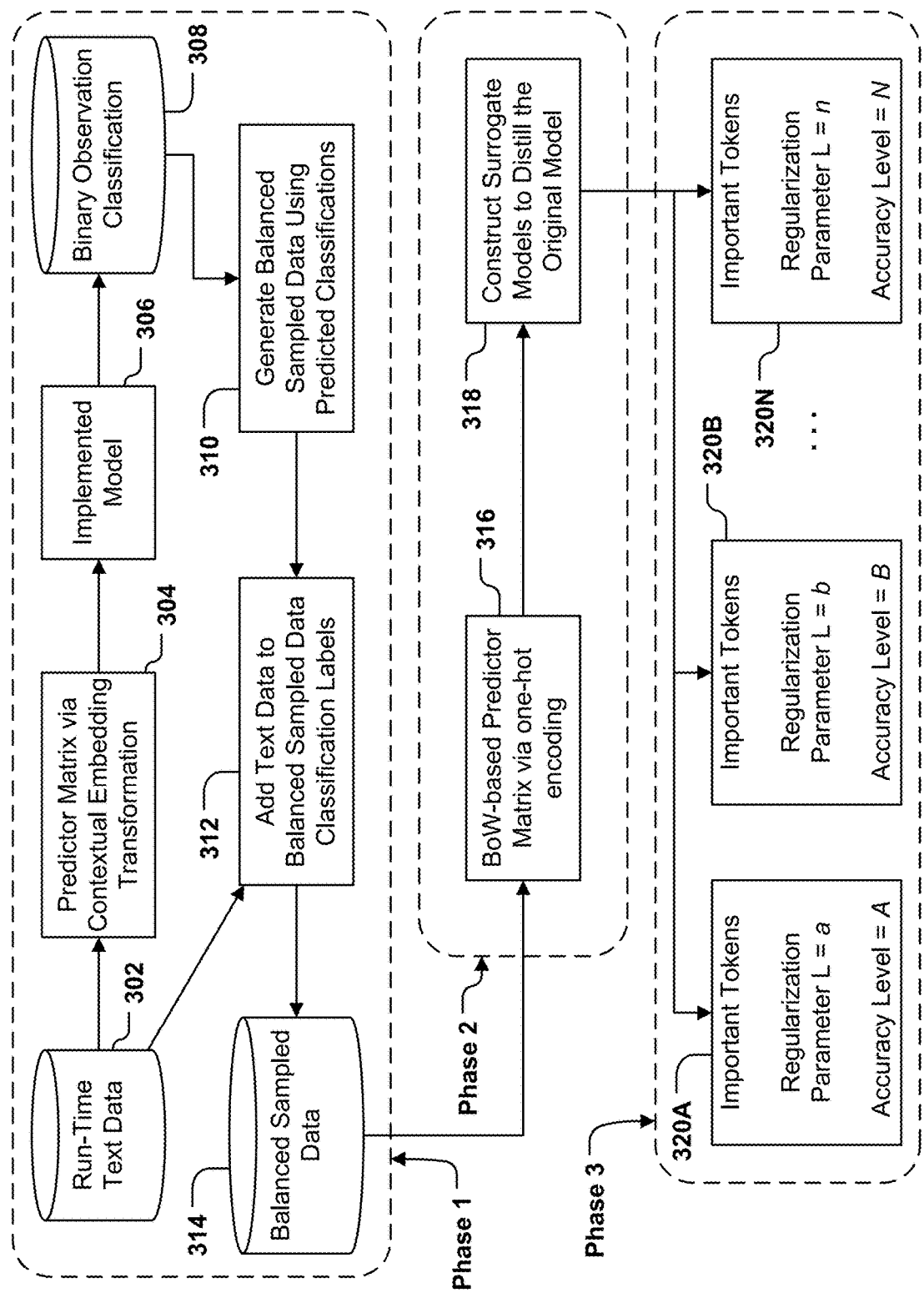
FIG. 3 illustrates a high-level description of one implementation for distillation of an NLP model, in accordance with some example embodiments described herein.

Example embodiments described herein operate by leveraging an interpretable surrogate model to facilitate interpretation of a production NLP model. A high-level illustration of an example implementation as may be contemplated herein is shown in FIG. 3, which illustrates a three-phased process for developing and applying a surrogate model to enhance interpretability of an existing NLP model. In phase 1 of the implementation, the production NLP model is used to score input data and generate a balanced sample of classified observations produced by the NLP model. These observations may be produced from a received set of run-time text data 302, which may comprise data received in real-time or near-real time from one or another source. This run-time text data 302 may be converted into a predictor matrix by way of a contextual embedding transformation 304 to produce a series of vector representations thereof. The NLP model 306 may then be used to generate a binary observation classification 308 from the vector representations. Subsequently, after having applied the NLP model to the run-time text data 302, a balanced data sample may be constructed. First, an equivalent number of occurrences having a first binary classification and a second binary classification, as predicted by the NLP model may be selected, as shown at element 310, following which the original text for the occurrences is gathered, as shown at element 312, to produce the balanced sampled data 314 that is needed for generation of a surrogate model based on application of the NLP to the run-time text data 302.

Phase 2 of the process shown in FIG. 3 illustrates construction of the surrogate model that may be used to facilitate interpretation of the original NLP model. Training the balanced sampled data gathered using the NLP model establishes that, for any given input, the surrogate model will produce output similar to the output of the NLP model. First, as shown at element 316, the balanced sampled data 314 is modified to create a bag-of-words-based predictor matrix via one-hot encoding. Subsequently, as shown at element 318, this predictor matrix may be used to construct a surrogate model that can distill the NLP. Regularization of the surrogate model may be altered to select an appropriate level of model complexity of the surrogate model that avoids overfitting while retaining strongly similar performance to the NLP model.

Finally, the surrogate model trained in Phase 2 is then examined to identify the input tokens that have the most influence on its output, which in turn comprise an approximation of the important tokens for the NLP model as approximated through interpretation of the surrogate model. This is shown by phase 3 of the illustration set forth in FIG. 3. The surrogate model will identify a distinct set of most important tokens based in part on the application of any regularization performed on the surrogate model to reduce its complexity. For instance, if trained using a penalty parameter (referred to in FIG. 3 as an "regularization parameter L" to indicate that the penalty parameter may be comprise an L1 parameter, an L2 parameter, or another penalty parameter) having a first value a, to achieve a distillation model accuracy level A, the surrogate model may return a first set of important tokens, as shown by element 320A. If trained using a different penalty parameter b, to achieve a distillation model accuracy level B, the surrogate model may return a different set of important tokens, as shown by element 320B. Any number of sets of important tokens may be generated in this fashion, as reflected in element 320N, showing the product of the most important tokens produced by a surrogate model trained to achieve a distillation model accuracy level N using a penalty parameter n.

Because of the similarity of output between the production NLP model and the surrogate model, the important identified tokens represent not only the tokens having the greatest influence on the output of the surrogate model, but also comprise an approximation of the tokens having the most influence on the output of the production NLP model under examination. The identified tokens may then be outputted for review, providing important insight enabling interpretability of the original NLP model.

Although a high level explanation of the operations of example embodiments has been provided above, specific details regarding the configuration of such example embodiments are provided below.

System Architecture

Figure 1:
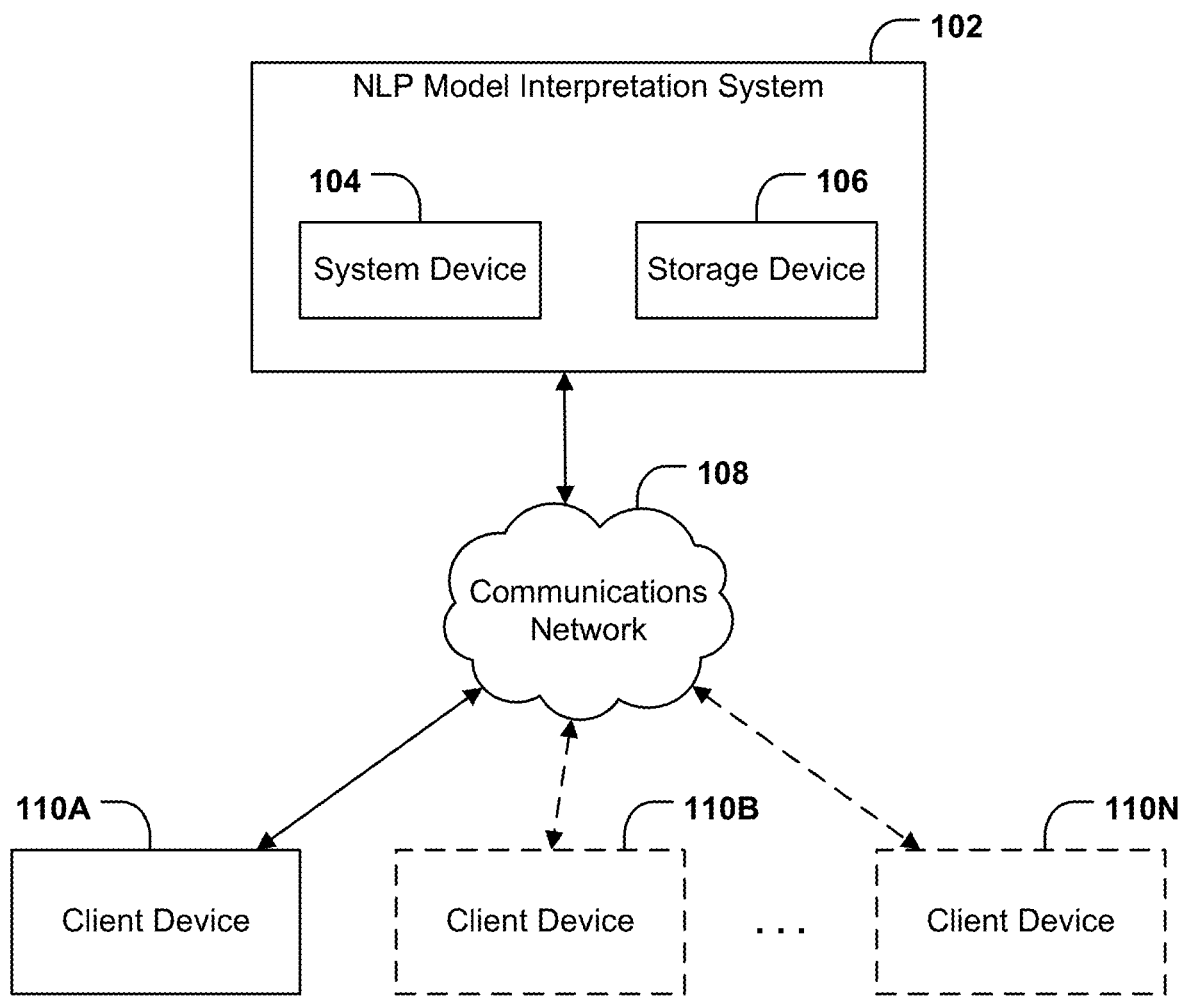
FIG. 1 illustrates an example computing environment within which some example embodiments may be deployed.

Example embodiments described herein may be implemented using any of a variety of computing devices or servers. To this end, FIG. 1 illustrates an example environment within which embodiments of the present disclosure may operate. As illustrated, an NLP model interpretation system 102 may include a system device 104 in communication with a storage device 106. Although system device 104 and storage device 106 are described in singular form, some embodiments may utilize more than one system device 104 and/or more than one storage device 106. Additionally, some embodiments of the NLP model interpretation system 102 may not require a storage device 106 at all. Whatever the implementation, the NLP model interpretation system 102, and its constituent system device(s) 104 and/or storage device (s) 106 may receive and/or transmit information via communications network 108 (e.g., the Internet) with any number of other devices, such as one or more of client device 110A, client device 110B, through client device 110N.

System device 104 may be implemented as one or more servers, which may or may not be physically proximate to other components of the NLP model interpretation system 102. Furthermore, some components of system device 104 may be physically proximate to the other components of the NLP model interpretation system 102 while other components are not. System device 104 may receive, process, generate, and transmit data, signals, and electronic information to facilitate the operations of the NLP model interpretation system 102. Particular components of system device 104 are described in greater detail below with reference to apparatus 200 in connection with FIG. 2.

Storage device 106 may comprise a distinct component from system device 104 or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the NLP model interpretation system 102 and/or the system device 104. Storage device 106 may store information relied upon during operation of the NLP model interpretation system 102, such as various machine learning algorithms or modeling techniques that may be used by the NLP model interpretation system 102 to train a surrogate model for a given NLP model, software packages that may be used by the NLP model interpretation system 102 to determine influential tokens for a surrogate model, input data to be used by the NLP model interpretation system 102 to train and/or test a given surrogate model, or the like. In addition, storage device 106 may store control signals, device characteristics, and access credentials enabling interaction between the NLP model interpretation system 102 and one or more of client device 110A through client device 110N.

Client device 110A through client device 110N may be embodied by any computing devices known in the art, such as desktop or laptop computers, tablet devices, smartphones, or the like. Client device 110A through client device 110N need not themselves be independent devices, but may be peripheral devices communicatively coupled to other computing devices.

Although FIG. 1 illustrates an environment and implementation of the present disclosure in which the NLP model interpretation system 102 interacts with one or more of client device 110A through client device 110N, in some embodiments users may directly interact with the NLP model interpretation system 102 (e.g., via input/output circuitry of system device 104), in which case a separate client device may not be required. Whether by way of direct interaction or interaction via a separate client device, a user may communicate with, operate, control, modify, or otherwise interact with the NLP model interpretation system 102 to perform functions described herein and/or achieve benefits as set forth in this disclosure.

Example Implementing Apparatuses

Figure 2:
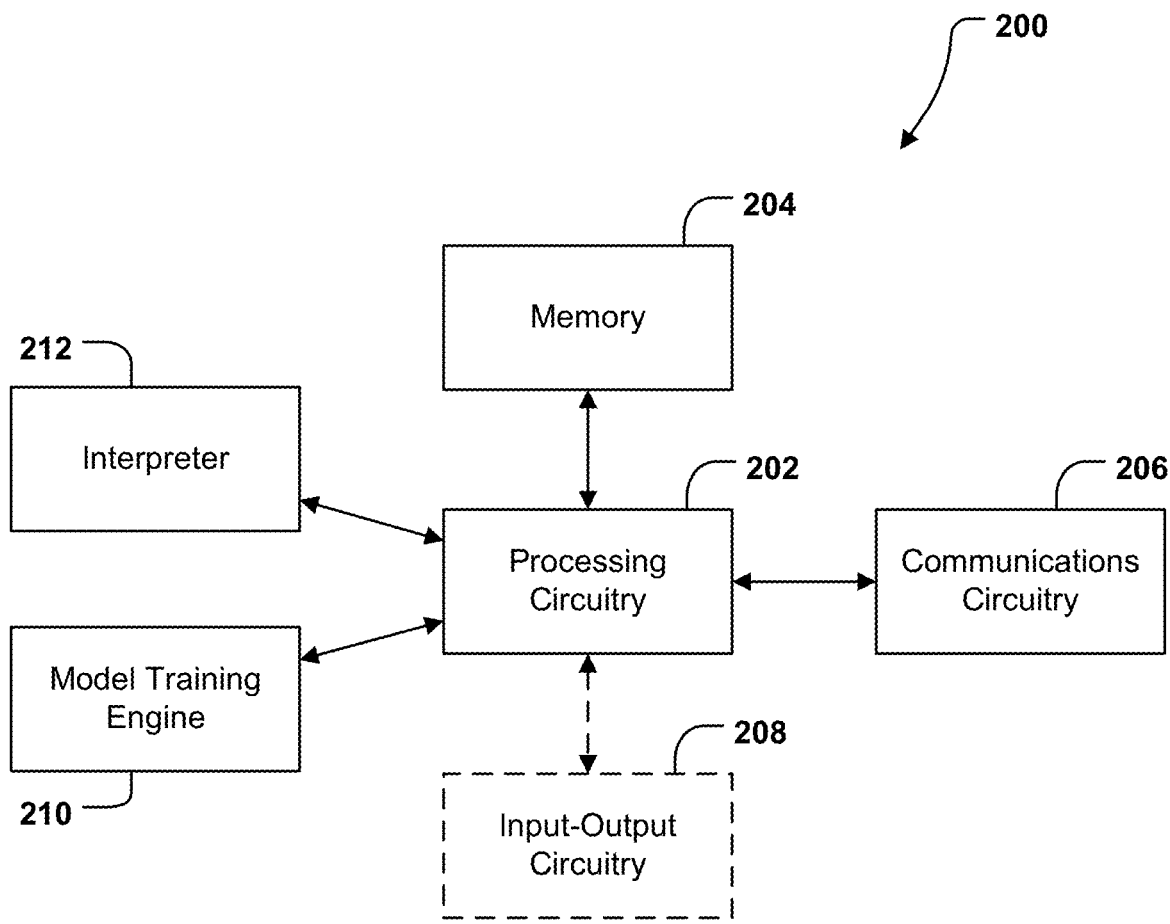
FIG. 2 illustrates a schematic block diagram of example circuitry embodying a device that may perform various operations in accordance with some example embodiments described herein.

System device 104 of the NLP model interpretation system 102 may be embodied by one or more computing devices or servers, shown as apparatus 200 in FIG. 2. As illustrated in FIG. 2, the apparatus 200 may include processor 202, memory 204, communications circuitry 206, input-output circuitry 208, model training engine 210, and interpreter 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIGS. 1 and 3 and below in connection with FIGS. 4 through 8.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202. Some embodiments of the apparatus 200 may not include input-output circuitry 208, in which case communication between the apparatus 200 and a user may be facilitated by communications circuitry 206 exchanging data with a separate device with which the user interacts, such as any of client device 110A through client device 110N (shown in FIG. 1).

In addition, the apparatus 200 further comprises a model training engine 210 configured to utilize the output from an NLP model to generate balanced sampled data, and to train a surrogate model for the NLP model using the balanced sampled data. As described in connection with FIG. 3 below, the model training engine 210 may utilize processor 202, memory 204, or any other hardware component included in the apparatus 200 to perform these functions. The model training engine 210 may be configured to train any of a number of different types of supervised machine learning models. The model training engine 210 may generate the balanced sampled data as described below in connection with FIGS. 4 and 5. The model training engine 210 may train the surrogate model as described below in connection with FIGS. 4 and 6. The model training engine 210 may further utilize communications circuitry 206 to transmit data to, and/or receive data from, a variety of sources (e.g., client device 110A through client device 110N or storage device 106, as shown in FIG. 1), and may utilize input-output circuitry 208 to transmit data to a user and/or receive data from a user.

In addition, the apparatus 200 further comprises an interpreter 212 configured to identify, from the surrogate model, the set of most-influential tokens in a given set of text data. The interpreter 212 may utilize processor 202, memory 204, or any other hardware component included in the apparatus 200 to perform these operations, as described in connection with FIG. 4 below. The interpreter 212 may further utilize communications circuitry 206 to transmit data to, and/or receive data from, a variety of sources (e.g., client device 110A through client device 110N or storage device 106, as shown in FIG. 1), and may utilize input-output circuitry 208 to present data to a user and/or receive data from a user.

Although components 202-212 are described in part using functional language, it will be understood that the particular implementations necessarily include the use of particular hardware. It should also be understood that certain of these components 202-212 may include similar or common hardware. For example, the model training engine 210 and interpreter 212 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the model training engine 210 and interpreter 212 may leverage processor 202, memory 204, communications circuitry 206, and/or input-output circuitry 208 as described above, it will be understood that each of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the model training engine 210 and interpreter 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the other components describe above as comprising the apparatus 200.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of an example apparatus 200, example embodiments of the present disclosure are described below in connection with a series of graphical user interfaces and flowcharts.

Example Operations

Figure 4:
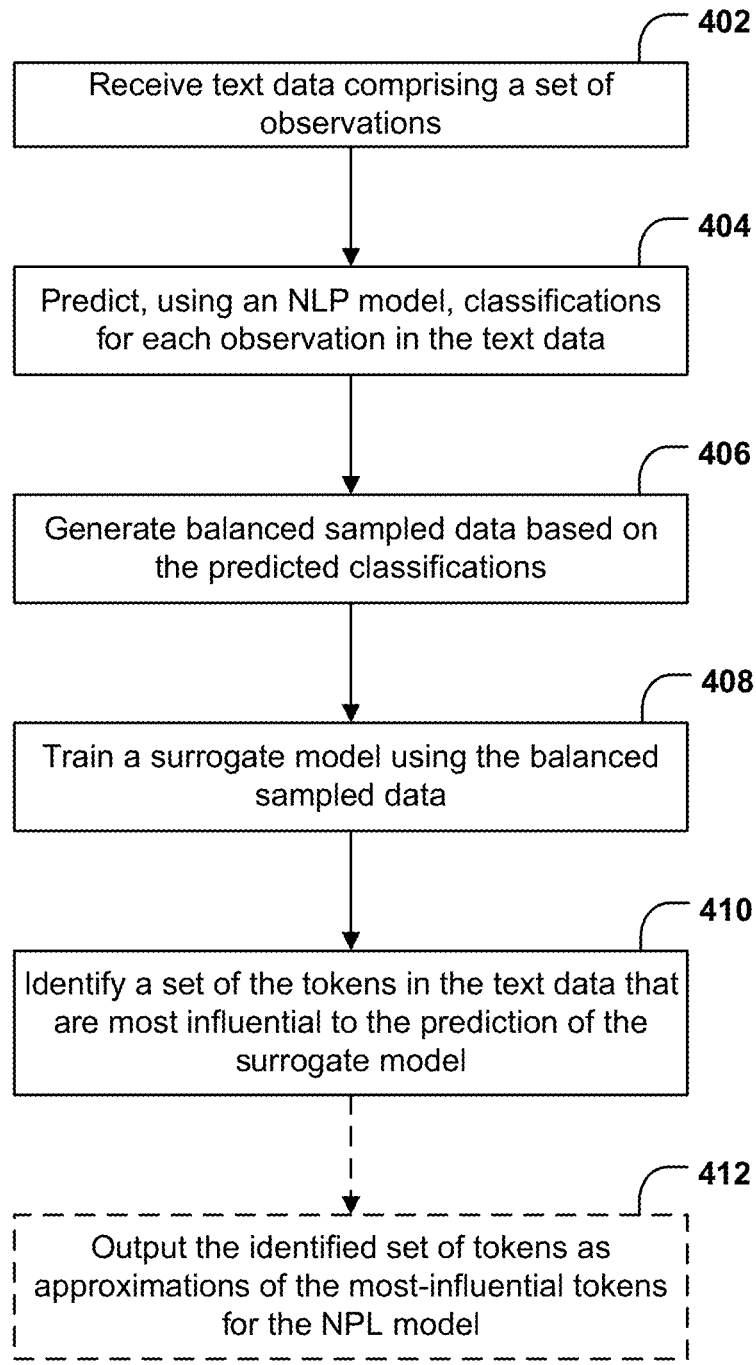
FIG. 4 illustrates an example flowchart for distillation of an NLP model, in accordance with some example embodiments described herein.
Figure 5:
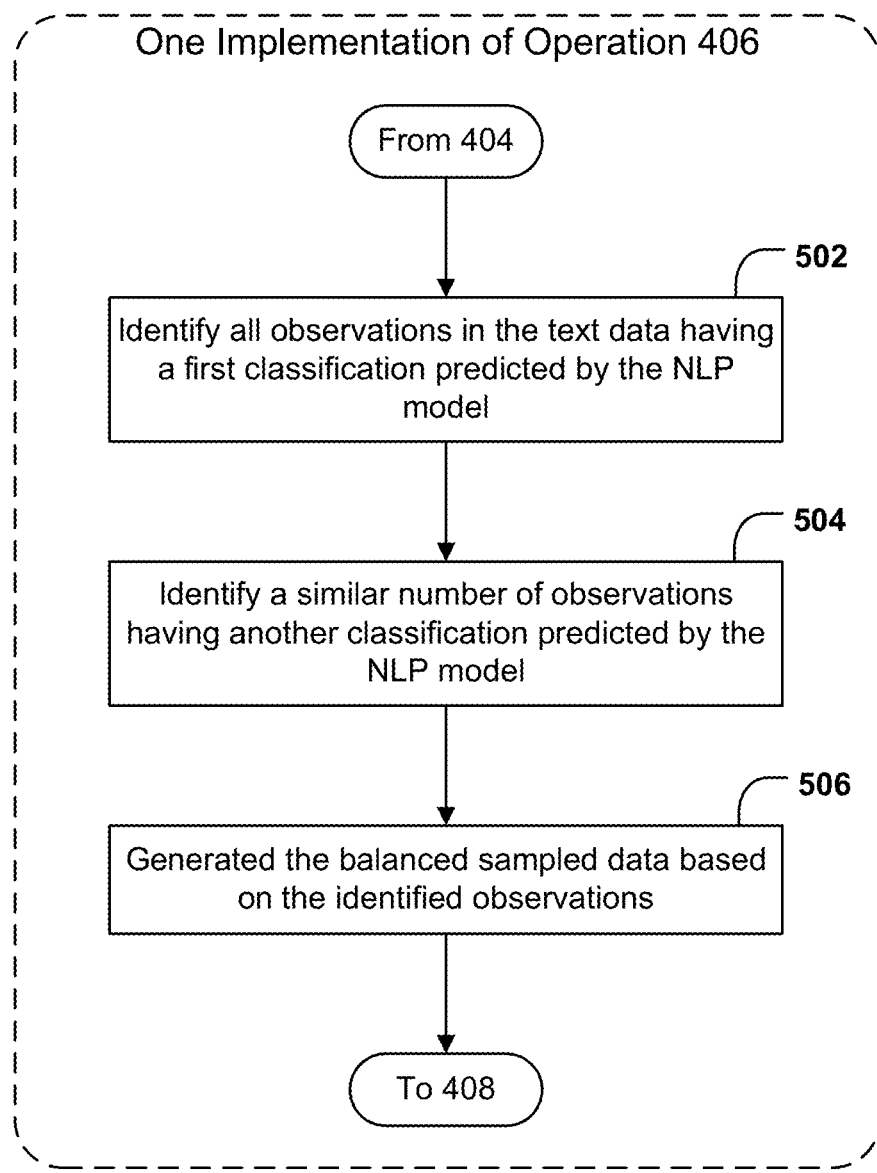
FIG. 5 illustrates an example flowchart for generating balanced sampled data from an NLP model, in accordance with some example embodiments described herein.
Figure 6:
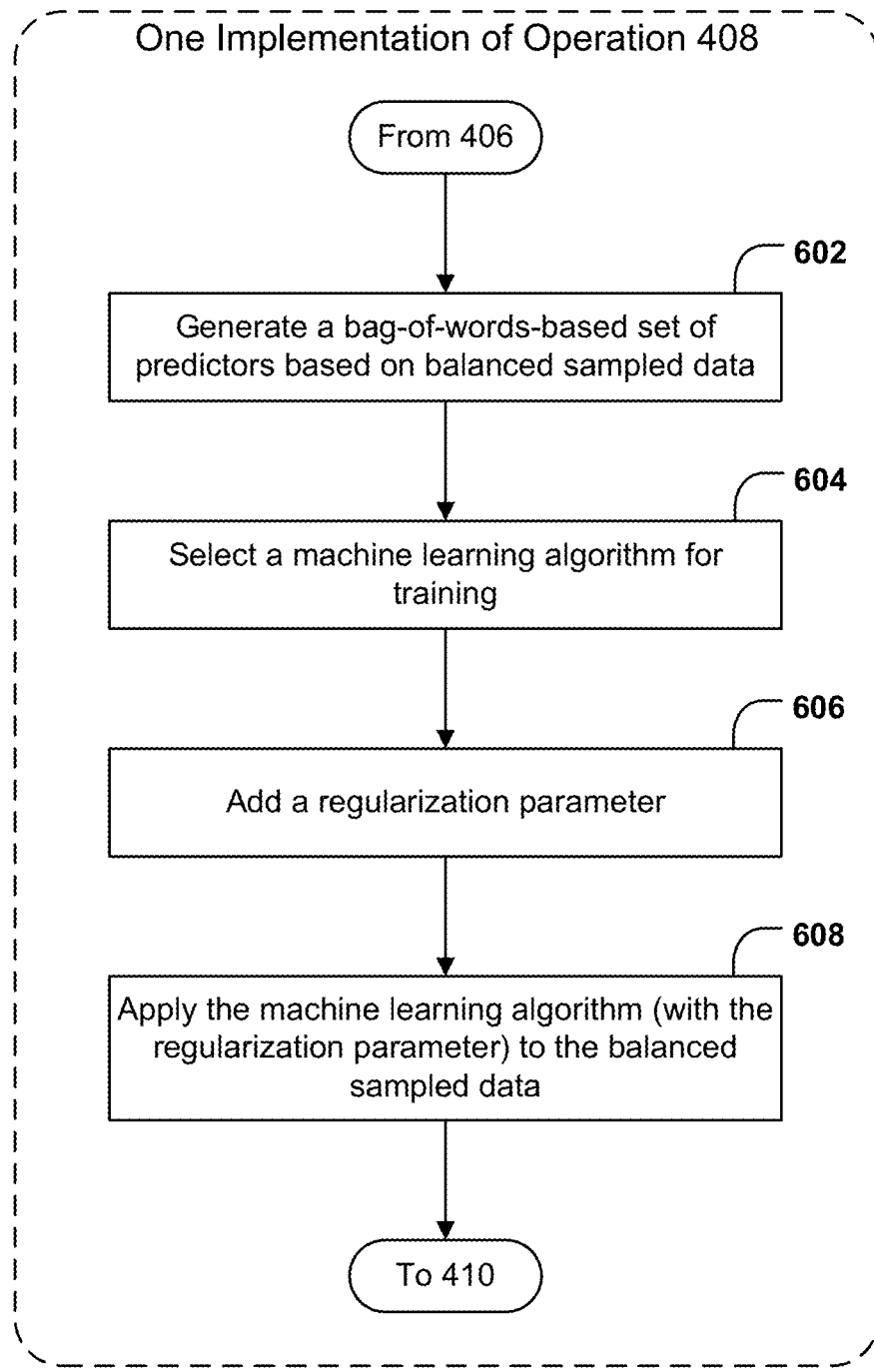
FIG. 6 illustrates an example flowchart for training a surrogate model using balanced sampled data, in accordance with some example embodiments described herein.

Turning to FIGS. 4-6, flowcharts are illustrated that contains example operations for distillation of an NLP model to facilitate interpretation. The operations illustrated in FIGS. 4-6 may, for example, be performed by system device 104 of the NLP model interpretation system 102 shown in FIG. 1, which may in turn be embodied by an apparatus 200, which is shown and described in connection with FIG. 2. To perform the operations described below, the apparatus 200 may utilize one or more of processing circuitry 202, memory 204, communications circuitry 206, input-output circuitry 208, model training engine 210, interpreter 212, and/or any combination thereof. It will be understood that user interaction with the NLP model interpretation system 102 may occur directly via input-output circuitry 208, or may instead be facilitated by a separate client device 110, as shown in FIG. 1, and which may have similar or equivalent physical componentry facilitating such user interaction.

Turning first to FIG. 4, example operations are shown for distillation of an NLP model to facilitate interpretation.

As shown by operation 402, the apparatus 200 includes means, memory 204, communications circuitry 206, input-output circuitry 208, or the like, for receiving text data. The text data may comprise any type of text that may be ingested by a typical NLP model. The text data may be unstructured or may be structured comprising an identifiable set of tokens. If the text data is unstructured, the apparatus 200 may further include means, such as processing circuitry 202 or the like, for leveraging software stored in a memory (e.g., memory 204 or the like) designed to parse the unstructured text data into the constituent set of tokens.

It will be understood that the text data may be received in various ways. For instance, some or all of the text data may have been previously stored by a storage device 106, which may comprise memory 204 of the apparatus 200 or a separate storage device. In another example, some or all of the text data may be provided by a separate device (e.g., one of client device 110A through client device 110N), in which case communications circuitry 206 may receive the relevant portion of the input dataset from that separate device. In another example, some or all of the text data may be provided directly to the apparatus 200 through user data entry or from a peripheral device, in which case the relevant text data may be received via input-output circuitry 208. Of course, the text data may be received from a combination of these sources.

As shown by operation 404, the apparatus 200 includes means, such as processing circuitry 202 or the like, for predicting, using an NLP model, classifications for each observation in the text data. While not shown in FIG. 4, operation 404 may include an initial step of identifying, by the apparatus 200, a particular NLP model to employ for classification of each observation in the text data. As described below in connection with FIG. 8, the NLP model may be identified by prompting a user to identify the NLP to use (e.g., by selecting a file location of the NLP model, or selecting a particular NLP model from a series of NLP models that may be known to the apparatus 200 and presented to the user. To this end, interaction with a user may occur via input-output circuitry 208 or via engagement between communications circuitry 206 of the apparatus 200 and a separate client device which a user may interact. In some embodiments, the NLP model to be utilize may be predefined by the apparatus 200, in which case it need not be specifically identified in operation 404.

To predict a classification of a given observation using most modern NLP models, the apparatus 200 must first convert the text data into a vector representation, such as by the processing circuitry 202 converting the text data into a predictor matrix by way of a contextual embedding transformation. For instance, the text data may comprise two observations, such as the following:

| Obs#1 | "Someone called house and said online application had to be completed by noon today This has been completed and we received respa docs You guys just need income documentation now" |
| Obs#2 | "Dear Emily There are no statements available yet On nd page is available credit and balance information you need Debbie Coffin" |

A contextual embedding matrix may convert the text of these two observations into a high-dimensional vector space, as illustrated by the following numerical columns:

|  | var_1 | var_2 | var_3 | ... | var_596 | var_597 | var_598 | var_599 | var_600 |
|---|---|---|---|---|---|---|---|---|---|
| Obs#1 | −0.05719 | 0.23163 | 0.16752 | ... | 0.01286 | 0.02852 | 0.01735 | 0.03177 | 0.01756 |
| Obs#2 | −0.13421 | −0.04112 | −0.15527 | ... | 0.01616 | 0.01248 | 0.00773 | 0.02207 | 0.02523 |

Because the relative importance of each of these numerical columns does not readily indicate the relative importance of any specific tokens in the original text data, this conversion prevents the NLP model from being readily transparent. This lack of transparency is a primary deficiency addressed by example embodiments described herein. However, to enable this result, the NLP model is first utilized to generate predicted outputs, which can in turn be used to construct one or more surrogate models that facilitate interpretation of the NLP model itself.

To this end, as part of operation 404 the processing circuitry 202 employs the NLP model to classify the various observations into one of two binary categories. For instance, for an NLP model that identifies complaints or special concerns in received observations, the NLP model will predict that a given observation is a complaint (e.g., having a value of 1) or that it is not a complaint (e.g., having a value of 0). In this way, the processing circuitry 202 predicts, using the NLP model, classifications for each observation in the text data. While generation of a surrogate model from an NLP model requires predicted classifications from the NLP model and the original input to the NLP model, accurately training a surrogate model in this fashion also requires a balanced sample of data from the NLP model. For instance, in the complaints-identifying NLP model example mentioned above, the alerting rate (i.e., the percentage of observations that comprise a complaint) is usually an extremely low (<1%) percentage of the observations of text data that may be received. Accordingly, to ensure that a surrogate model will provide relevant information that can be used to interpret a given NLP model, it is not sufficient just to retrieve input and output data from the NLP model, but it is also important that such data be balanced, as doing so maximizes the accuracy of the surrogate model by including more informative samples related to the particular target of classification (e.g., complaints).

As shown by operation 406, the apparatus 200 includes means, such as processing circuitry 202, memory 204, communications circuitry 206, input-output circuitry 208, model training engine 210, interpreter 212, or the like, for generating balanced sampled data based on the predicted classifications of the observations in the text data. This balanced sampled data may be generated as a series of elements in a balanced sampled data structure, as described as follows in connection with FIG. 5.

Turning now to FIG. 5, example operations are described for generating the balanced sampled data from an NLP model. In operation 502, the apparatus 200 includes means, such as model training engine 210 or the like, for identifying all observations in the text data having a first classification predicted by the NLP model. In some embodiments, this first classification will be the event that is expected to occur less frequently. For instance, using the complaints-identifying NLP model example mentioned above, this first classification may identify those observations that are predicted to be complaints.

As shown by operation 504, the apparatus 200 includes means, such as model training engine 210 or the like, for identifying a similar number of observations having another classification predicted by the NLP model. Because the first classification occurs less frequently than its counterpart, there will typically be fewer observations produced by the NLP model having the first classification than the second classification. Accordingly, in operation 504, the model training engine 210 will need only sample the remaining observations not identified in operation 502 to obtain a similar number of observations having a second classification as were identified in operation 502. The model training engine 210 may randomly sample the remaining observations for this purpose, or may utilize another sampling methodology.

Finally, as shown by operation 506, the apparatus 200 includes means, such as model training engine 210 or the like, for generating the balanced sampled data based on the identified observations. In this regard, generating the balanced sampled data structure may involve compiling (1) the text comprising each identified observation having the first predicted classification, (2) the text comprising each identified observation having the second predicted classification, and (3) for the text comprising each identified observation, a label identifying its predicted classification label. The model training engine 210 may store all of this information using a balanced sampled data structure having a series of records, each record having a field comprising the text of an identified observation and a field comprising the label identifying its predicted classification.

Returning to FIG. 4, operation 408 shows that the apparatus 200 includes means, such as model training engine 210 or the like, for training a surrogate model using the balanced sampled data. To this end, the surrogate model relies on bag-of-words-based predictors, which are the binary predictors to denote whether or not a token will show up in the input text content. As such, these predictors will be the tokens themselves rather than the transformed vectors used by the original NLP model. Hence, the importance of the predictors to the surrogate model will directly reflect the importance of the tokens to the surrogate model, which offers a more straightforward means for interpretation than offered by the original NLP model. Training a surrogate model using the balanced sampled data is described in greater detail in connection with FIG. 6 below. Because the surrogate model is trained using the inputs to the NLP model along with the predictions outputted by the NLP model, it will produce a similar, if not identical, classification output as the NLP model. The similarity (or lack thereof) in output of the surrogate model to the NLP model will largely be a product of the regularization penalty selected during generation of the surrogate model, as described in greater detail below.

As shown by operation 410, the apparatus 200 includes means, such as interpreter 212 or the like, for identifying a set of tokens in the text data that are most influential to the prediction of the surrogate model. Where the surrogate model comprises a support vector machine (SVM), the interpreter 212 may identify the set of most-influential tokens by generating, from the support vector machine, coefficient estimates for each token in the text data, and then selecting a number of tokens having the highest coefficient estimates. Where the surrogate model comprises an extreme gradient boosted (XGBoost) model, the interpreter 212 may identify the set of most-influential tokens by generating, from the extreme gradient boosted model, Shapley additive explanations (SHAP) value for each token in the text data, and then selecting a number of tokens having the highest aggregated SHAP effects. In any case, the number of tokens identified by the interpreter 212 may be predefined, or the number of tokens can be variable and selected by a user engaging with the apparatus 200 (e.g., directly via input-output circuitry 208 or indirectly via a separate client device interacting with the apparatus 200 via its communications circuitry 206). As noted previously, because of the similarity of output between the NLP model and the surrogate model, these most-influential tokens represent not only the tokens in the text data having the greatest influence on the output of the surrogate model, but also comprise an approximation of the tokens in the text data having the most influence on the output of the NLP model itself.

Accordingly, as shown by operation 412, the apparatus 200 includes means, such as memory 204, communications circuitry 206, input-output circuitry 208, or the like, for outputting the identified set of tokens as approximations of the most-influential tokens in the text data for the NLP model. This approximated set of most-influential tokens in the text data for the NLP model may then serve as the foundational basis for interpretation of the NLP model.

Turning next to FIG. 6, example operations are shown for training a surrogate model using balanced sampled data. As noted previously, the operations described in connection with FIG. 6 may follow from the completion of operation 406 above, in which balanced sampled data is generated based on the predicted classifications produced by the NLP model.

Having generated the balanced sampled data, the apparatus 200 includes means, such as model training engine 210 or the like, for generating a bag-of-words-based set of predictors based on the balanced sample data, as shown in operation 602. To this end, the model training engine 210 may apply one-hot encoding to convert the data from the balanced sampled data structure into the bag-of-words-based set of predictors. One-hot encoding is a process by which categorical variables are converted into binary indicators that can be input into a variety of machine learning algorithms and that generally enable better model fitting and prediction accuracy. Doing this, each text input will be converted into a prediction vector where the vector length is the same as the vocabulary size. The predictor fields are the tokens in the vocabulary, and the values of the predictors are 1 if the tokens appear in the input text and 0 otherwise.

The process for generating the bag-of-words-based set of predictors can be described with reference to an example. As noted previously, input text data may comprise two observations, such as the following:

| | |
|---|---|
| Obs#1 | "Someone called house and said online application had to be completed by noon today This has been completed and we received respa docs You guys just need income documentation now" |
| Obs#2 | "Dear Emily There are no statements available yet On nd page is available credit and balance information you need Debbie Coffin" |

As a reminder, for a typical NLP model, a contextual embedding matrix may convert the text of these two observations into a high-dimensional vector space, as illustrated by the following numerical columns:

| | var_1 | var_2 | var_3 | ... | var_596 | var_597 | var_598 | var_599 | var_600 |
|---|---|---|---|---|---|---|---|---|---|
| Obs#1 | −0.05719 | 0.23163 | 0.16752 | ... | 0.01286 | 0.02852 | 0.01735 | 0.03177 | 0.01756 |
| Obs#2 | −0.13421 | −0.04112 | −0.15527 | ... | 0.01616 | 0.01248 | 0.00773 | 0.02207 | 0.02523 |

As noted previously, the relative importance of each of these numerical columns is not intuitive. Accordingly, by instead applying one-hot encoding to the original text data the predictors are binary indicators that represent whether or not a certain token shows up in the initial text data. As such, the predictors are the tokens in the defined vocabulary and the predictors' importance reflect the importance of the tokens directly. Accordingly, application of one-hot encoding to these two text data observations provides the following:

Tokens such as "someone" and "application" show up in the text data of the first observation, and hence the value of those predictors are "1" for the first observation. Similarly, values of "credit" and "balance" are assigned "1" for the second observations, and tokens covered by none of the two examples (e.g., "escalate") are assigned a value "0" for both observations.

As shown by operation 604, the apparatus 200 includes means, such as model training engine 210 or the like, for selecting a machine learning algorithm to use for training. The model training engine 210 may select any of a number of different types of machine learning algorithms. Two common frameworks are the SVM and XGBoost, although other machine learning algorithms may be selected that produce interpretable models, with the key requirement being the ability of the subsequently generated model to output the most important tokens. A SVM algorithm, for instance, produces a SVM that can do this via coefficient estimates, while with XGBoost it can be done via SHAP value estimates aggregation. The important tokens output by distillation models will be considered as the approximated important tokens used to interpret the original NLP model, since the input and output of the original NLP model are used to construct the distillation models.

As shown by operation 606, the apparatus 200 includes means, such as processing circuitry 202, memory 204, communications circuitry 206, input-output circuitry 208, model training engine 210, interpreter 212, or the like, for adding a regularization parameter to the machine learning algorithm. Given the large vocabulary size of the bag-of-words-based predictor generated in operation 602, the predictor matrix used for surrogate model training may contain thousands of predictors, many of which may have little impact on the final predicted results. Accordingly, application of a flexible regularization can adjust the model complexity (number of predictors included in the model) to control the desired accuracy and complexity of the generated surrogate model. Based on the bag-of-words-based predictors obtained and the predicted labels given the balanced sampled data, a given surrogate model can achieve a desired model distillation accuracy (e.g., 90%, 95%, 99%) by adjusting the model complexity (number of predictors included in the model) via regularization To this end, the regularization parameter may comprise an L1 penalty parameter. L1 regularization penalizes the absolute value of the magnitude of the predictors' coefficients. In other words, it shrinks the coefficients of certain predictors to zero and hence eliminate those corresponding predictors from the model if the coefficients are too small given the L1 regularization parameter. L1 regularization is used to control model complexity and can yield sparse models (i.e., models with few coefficients). The regularization parameter may in some instances comprise an L2 penalty parameter, which

| | someone | called | application | completed | ... | credit | balance | resolved | escalate |
|---|---|---|---|---|---|---|---|---|---|
| Obs#1 | 1 | 1 | 1 | 1 | | 0 | 0 | 0 | 0 |
| Obs#2 | 0 | 0 | 0 | 0 | | 1 | 1 | 0 | 0 | penalizes the square of the magnitude of the predictors' coefficients. L2 regularization does not yield sparse models of lower complexity like L1 regularization, but it does still minimize the impact of low-importance predictors. L2 regularization may be preferable where many predictors have comparable coefficients (and thus comparable impact on model output), because L2 regularization will not eliminate the impact of any predictors entirely and, in turn, is likely to retain better overall predictive power while still reducing overfitting risk.

As there is a monotone relationship between the penalty parameter and the distillation model accuracy, the desired model with the targeted accuracy can be obtained by increasing or decreasing the penalty parameter from a baseline model given the default hyperparameters used in the surrogate models. For example, if a default SVM leads to 92% distillation model accuracy, a 95% SVM distillation model can be obtained by gradually increasing the value of an L1 penalty parameter until the 95% is achieved, and the 90% SVM distillation model can be obtained by gradually decreasing the value of the L1 parameter. This is because the strength of the regularization is negatively correlated to the value of the L1 penalty parameter in the SVM algorithm. Benefits of regularization include avoidance of overfitting data, and reducing of the number of predictors in the model, which in turn can enhance the value of interpretation using the surrogate model.

Accordingly, while in some embodiments the value of the penalty parameter may be predefined, in other implementations the value of the penalty parameter may be selected. Selecting the value of the penalty parameter may enable optimization of the penalty parameter to reduce overfitting while retaining sufficient accuracy to still identify the correct tokens as being most important. To select the value of the penalty parameter, the model training engine 210 may train a first surrogate model using a first penalty parameter to achieve a first level of accuracy, and may train a second surrogate model using a second penalty parameter to achieve a second level of accuracy for the second surrogate model. The model training engine 210 may further train additional surrogate models using corresponding additional penalty parameters to produce N surrogate models achieving distillation model accuracy at N different levels. The model training engine 210 may then identify a set of most-influential tokens for the first surrogate model, identify a set of most-influential tokens for the second surrogate model, and identify a set of most-influential tokens for each of the remaining N surrogate models to obtain N sets of most-influential tokens based on the N surrogate models. Subsequently, the model training engine 210 may compare the N sets of most-influential tokens across the N surrogate models and select, based on the comparison, the most appropriate surrogate model, with its corresponding penalty parameter value. The most appropriate surrogate model may comprise the surrogate model having the lowest accuracy while still retaining a requisite percentage of most-influential tokens. In the case of selection from among just a first surrogate model and a second surrogate model, the model training engine 210 may compare the set of most-influential tokens for the first surrogate model to the set of most-influential tokens for the second surrogate model, and may select, based on the comparison, the first penalty parameter or the second penalty parameter as the value for the penalty parameter. As between any two surrogate models, the model training engine 210 may determine whether the less accurate model returns more than the requisite percentage of most-influential tokens as the more accurate model. If so, the model training engine 210 may select the penalty parameter for the less accurate model. This requisite percentage may be selected by a user or may be predefined by the NLP model interpretation system 102. Overall, many surrogate models may be trained using a variety of different penalty parameters, and the penalty parameter ultimately selected may be that corresponding to the surrogate model having the lowest accuracy while still retaining more than the requisite percentage of most-influential tokens as the most accurate model.

Figure 7A:
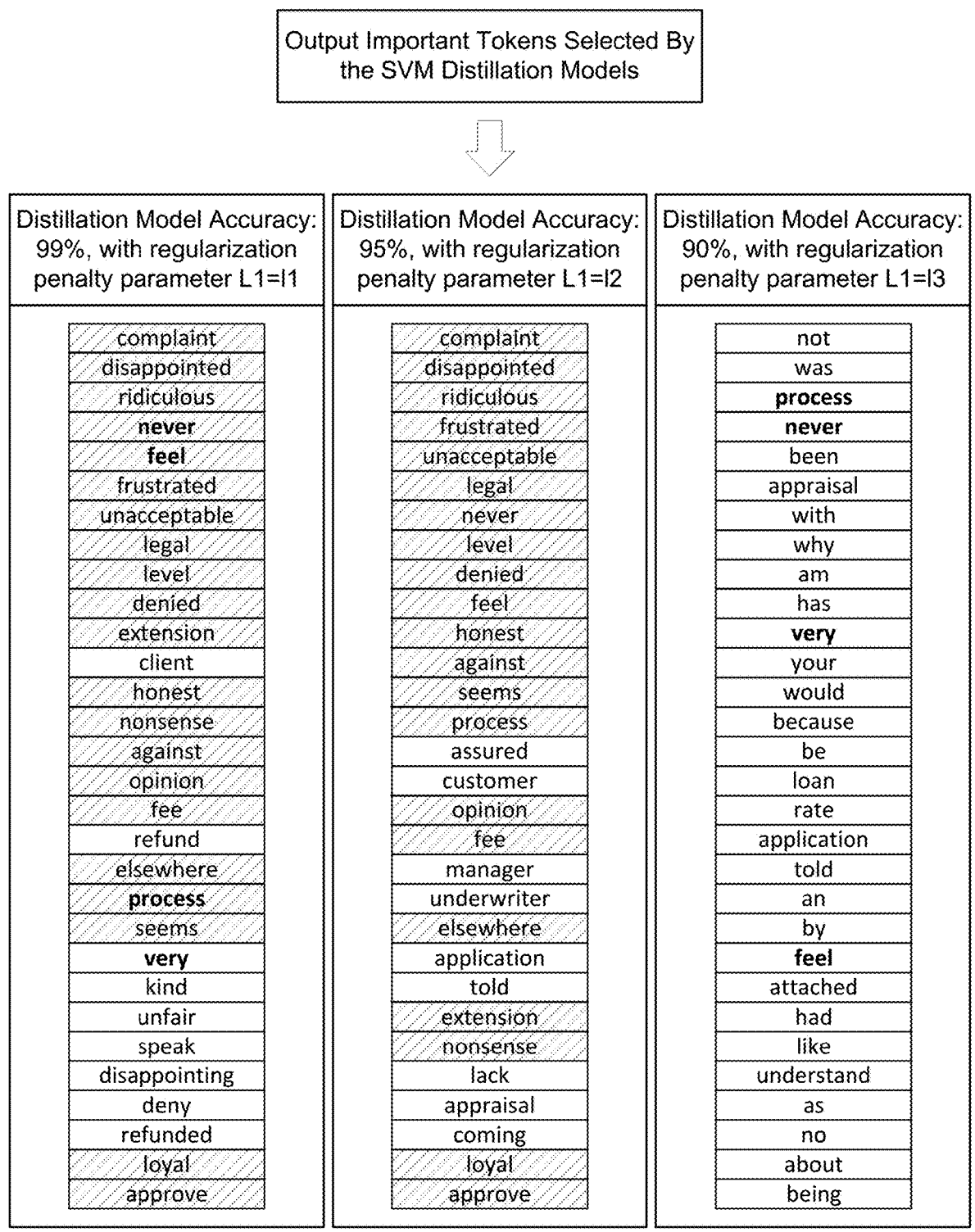
FIG. 7A illustrates an example set of tokens identified using a support vector machine surrogate model for three different regularization parameter values, in accordance with some example embodiments described herein.
Figure 7B:
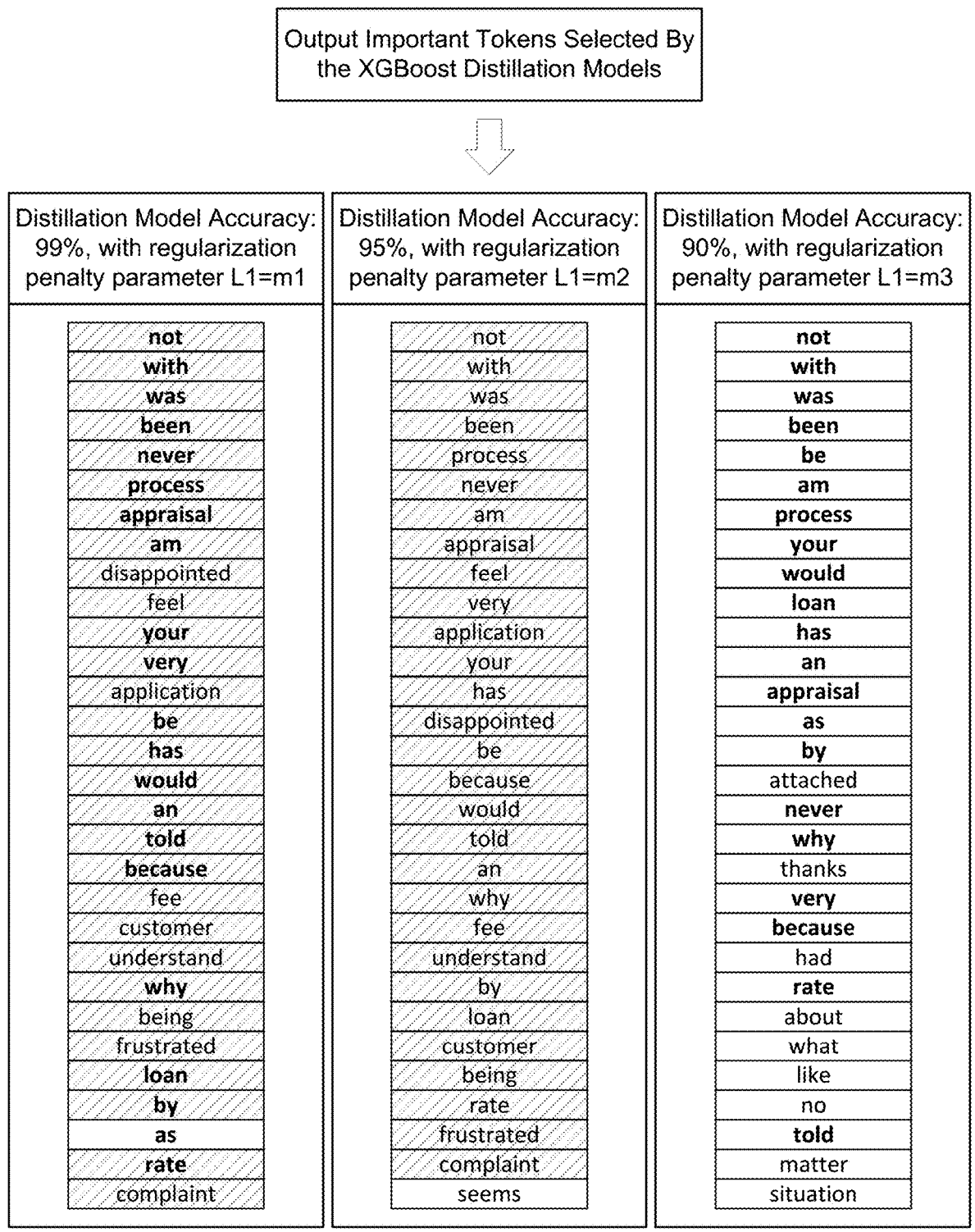
FIG. 7B illustrates an example set of tokens identified using an extreme gradient boosted surrogate model for three different regularization parameter values, in accordance with some example embodiments described herein.

This penalty parameter selection procedure may be better understood in connection with FIGS. 7A and 7B, each of which illustrates example sets of tokens for three different regularization parameter values, as identified using support vector machine surrogate models (FIG. 7A) or extreme gradient boosted surrogate models (FIG. 7B). The shaded cells are the common tokens shared by the 99% accuracy and 95% accuracy models, while the bolded text cells are the common tokens shared by the 99% accuracy and 90% accuracy models. The results illustrate that the important tokens identified by the surrogate models are likely to vary depending on the accuracy of the distillation models. It is thus possible to adjust the model accuracy (via penalty parameter) to achieve the desired important tokens per application scenario and need. In the penalty parameter selection process set forth directly above, the model training engine 210 may identify, for instance, that the 99% accuracy SVM model and the 95% accuracy SVM model shown in FIG. 7A return similar intuitive important tokens. Because of the large overlap, the model training engine may select the penalty parameter corresponding to the 95% accuracy SVM model, given it retains sufficient interpretive power while likely reducing overfitting risk. With reference to the XGBoost models shown in FIG. 7B, the 95% model is also effective as in the SVM model examples, but the model training engine 210 may in fact select the penalty parameter corresponding to the 90% accuracy XGBoost model, because it is only slightly less effective but enables use of a much less complex surrogate model (thereby enhancing ease of interpretation). Although FIGS. 7A and 7B illustrate the use of L1 penalty parameters for this purpose, it will be understood that L2 or other penalty parameters may instead be used in various embodiments.

Having illustrated various ways to select a regularization parameter for the machine learning model, operation 608 of FIG. 6 illustrates that the apparatus 200 includes means, such as model training engine 210, or the like, for applying the machine learning algorithm (with the regularization parameter) to the bag-of-words-based set of predictors to produce the surrogate model that will be used for interpretation of the NLP model. Following generation of the surrogate model in this fashion, the procedure returns back to operation 410 to enable utilization of the surrogate model.

As described above, example embodiments provide methods and apparatuses that enable improved verification and interpretation of the complex NLP models that are proliferating in the NLP community but which historically have not been interpretable. As noted previously, the need for interpretability is often driven as a practical matter by rigorous model validation procedures and increased regulatory oversight, but also addresses a ubiquitous need to ensure that modeling solutions produce results in line with expectations and that are not biased in unexpected ways. By providing a new path for interpretability of complex NLP models, example embodiments described herein thus preserve the ability to utilize such models despite their prior shortcomings in interpretability. Moreover, because complex NLP models are increasingly more accurate than natively interpretable NLP solutions, example embodiments thus provide significant technical benefits to organizations that need sophisticated NLP capabilities but also require model interpretability to satisfy other organizational needs. Accordingly, example embodiments described herein provide a critical technical advance facilitating deeper integration of complex NLP modeling solutions into the operations of a company while minimizing model risk.

FIGS. 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Graphical User Interface

Figure 8:
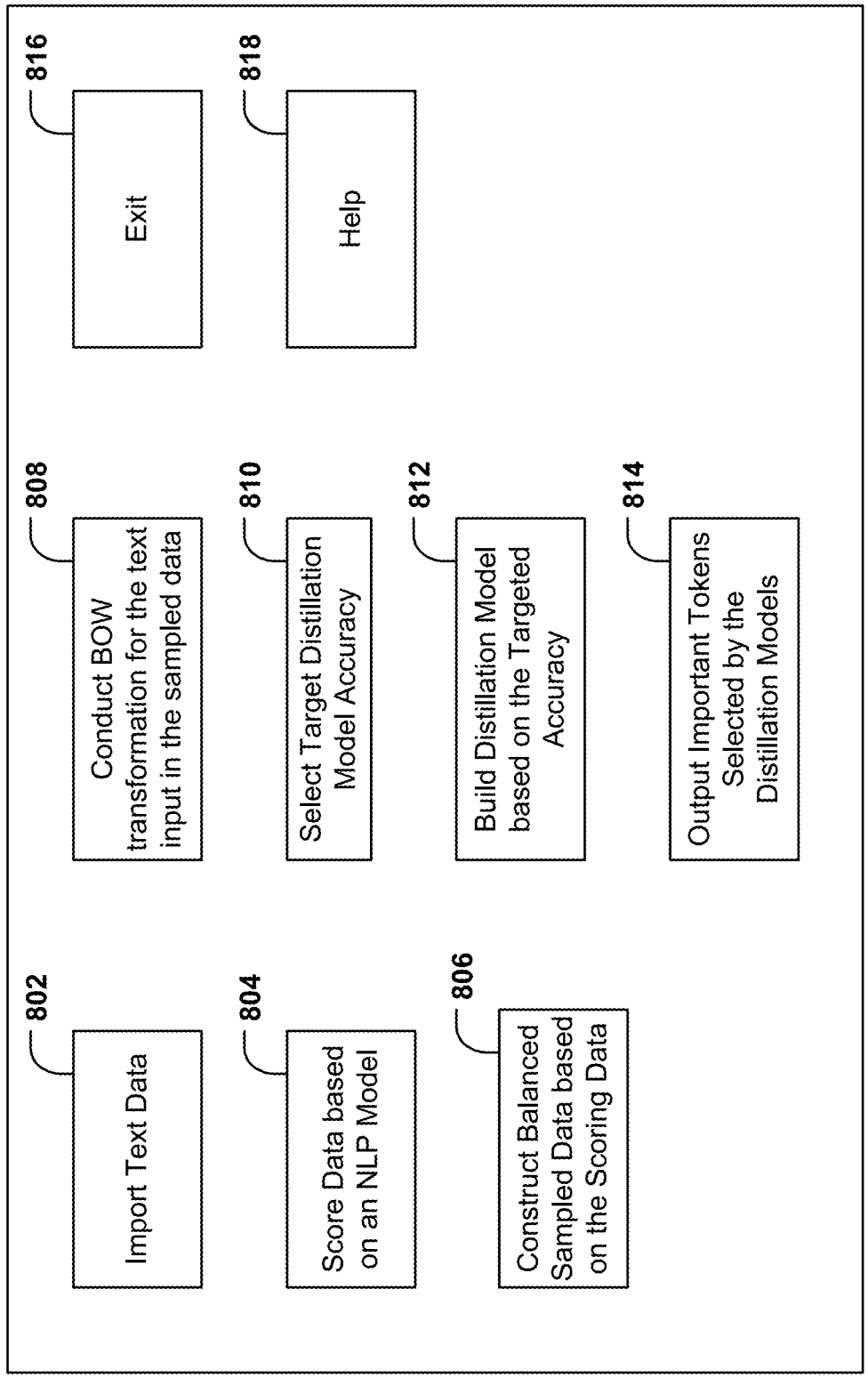
FIG. 8 illustrates an example user interface that may be used in some example embodiments described herein.

Turning to FIG. 8, a graphical user interface (GUI) is depicted that illustrates one example implementation with which a user may interact to control operation of the NLP model interpretation system 102. As noted previously, a user may interact with the NLP model interpretation system 102 by directly engaging with input-output circuitry 208 of an apparatus 200 comprising a system device 104 of the NLP model interpretation system 102. In such an embodiment, the GUI shown in FIG. 8 may be displayed to a user by the apparatus 200. Alternatively, a user may interact with the NLP model interpretation system 102 using a separate client device (e.g., any of client device 110A through client device 110N, as shown in FIG. 1), which may communicate with the NLP model interpretation system 102 via communications network 108. In such an embodiment, the GUI shown in FIG. 8 may be displayed to the user by the respective client device.

Regardless of the manner by which the user may interact with the NLP model interpretation system 102, FIG. 8 illustrates that in some embodiments, the user may direct performance of various functionalities recited herein to develop and deploy a surrogate model that may facilitate interpretability of an original NLP model. To this end, the user may select icon 802 to manually initialize the process by importing text data into the NLP model interpretation system 102. Selection of this icon may cause the NLP model interpretation system 102 to prompt the user to enter text (e.g., via a command line) or to select a file location from which the NLP model interpretation system 102 may retrieve a document comprising the text on which the procedure should operate. Having imported text data, the user may select icon 804 to manually cause scoring of the imported text data using an existing NLP model. To this end, the user may be prompted to provide a file location from which the NLP model interpretation system 102 may retrieve the NLP model to utilize. In some implementations, the NLP model may be previously known to the NLP model interpretation system 102 and it thus may not be necessary for the user to select a location of the NLP model. Moreover, the imported text data may be automatically scored once it is imported, in which case the user may not need to select icon 804 to cause performance of this functionality (and icon 804 may not even be presented to the user for selection in such embodiments).

The user may select icon 806 to manually initialize construction of the balanced sampled data as described previously herein. Upon selection of icon 806, the user may be prompted by the NLP model interpretation system 102 to identify a size of the balanced sampled data set to be generated, although in some implementations the NLP model interpretation system 102 may predefine this size to avoid requiring user entry each time icon 806 is selected. It will be understood that in some embodiments, scoring the data by virtue of selection of icon 804 may automatically also initiate the construction of the balanced sampled data, and in such implementations, icon 806 might not be presented to the user via the GUI shown in FIG. 8.

The user may thereafter select icon 808 to cause the NLP model interpretation system 102 to conduct the bag-of-words-based predictor matrix for use in training of a surrogate model based on the balanced sampled data. As above, it will be understood that in some embodiments, the generation of the bag-of-words-based predictor matrix may automatically occur upon construction of the balanced sampled data, and in such implementations, icon 808 might not be presented to the user via the GUI shown in FIG. 8.

The user may select icon 810 to select a target level of accuracy for the surrogate model to be generated by the NLP model interpretation system 102. Selection of icon 810 may cause the NLP model interpretation system 102 to prompt the user to provide a penalty parameter corresponding to the selected accuracy level. In some embodiments, this penalty parameter may be predefined and thus the user may not be prompted to provide it at this stage (and icon 810 may not even be selectable by or presented to the user), or the user may be prompted to provide the penalty parameter as part of completing another stage in the process (e.g., upon selection of icon 802 to import the text data to use in the procedure). Furthermore, in some embodiments the user may be prompted to enter multiple different penalty parameters, causing the NLP model interpretation system 102 to generate more than one surrogate model, such that the outputs of surrogate models at different levels of accuracy can be evaluated against each other in parallel.

The user may select icon 812 to cause creation of the surrogate model by the NLP model interpretation system 102. In some embodiments, the creation of the surrogate model may be automatically initiated once sufficient data is provided, such as the importing of text data, the identification of an NLP model to interpret, and the selection of a penalty parameter. In such embodiments, the GUI shown in FIG. 8 may not illustrate icon 812 at all.

The user may also select icon 814 to cause outputting or display of the most important tokens selected by the generated surrogate model(s). The user may be prompted by the NLP model interpretation system 102 to specify the manner by which the user wishes to receive the set of tokens (e.g., by visual presentation on the display of the device with which the user interacts, by writing the set of tokens to a file location that the user may specify, or the like).

Finally, the user may select icon 816 to exit the application hosted by the NLP model interpretation system 102, or may select icon 818 for assistance interacting with the NLP model interpretation system 102.

Through the provision of a GUI such as that shown in FIG. 8, a user may manually initialize different aspects of the procedure set forth herein, and may do so in a "low-code" implementation that does not require sophisticated understanding of data science, machine learning, or computer programming skills. In turn, example implementations that utilize a GUI such as that shown in FIG. 8 offer expanded access to the model interpretation toolkit described herein, thus enabling greater understanding and interpretation of sophisticated NLP modeling techniques even by those without significant prior experience.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for distillation of a natural language processing (NLP) machine learning model, the method comprising:
   receiving, by communications circuitry, a set of text data comprising a set of observations;
   predicting, by processing circuitry and using the NLP machine learning model, classifications for each observation in the set of text data;
   generating, by a model training engine, a balanced sampled data structure based on the predicted classifications for each observation in the set of text data;
   selecting, by the model training engine, a value for a penalty parameter based on a comparison between outputs from a first surrogate machine learning model and a second surrogate machine learning model;
   training, by the model training engine, a surrogate machine learning model using the balanced sampled data structure and the value for the penalty parameter; and
   identifying, by an interpreter and from the surrogate machine learning model, a set of most-influential tokens in the set of text data.

2. The method of claim 1, wherein generating the balanced sampled data structure includes:
   identifying, by the model training engine, all observations in the set of text data having a first predicted classification;
   identifying, by the model training engine, a similar number of observations in the set of text data having a second predicted classification; and
   generating, by the model training engine, the balanced sampled data structure by compiling:
      text comprising each identified observation having the first predicted classification,
      text comprising each identified observation having the second predicted classification, and
      for the text comprising each identified observation, a label identifying its predicted classification label.

3. The method of claim 1, wherein training the surrogate machine learning model using the balanced sampled data structure and the value for the penalty parameter includes:
   applying, applying, by the model training engine, one-hot encoding to convert the balanced sampled data structure into a bag-of-words-based set of predictors;
   selecting, by the model training engine, a machine learning algorithm for training;
   adding, by the model training engine, the value of the penalty parameter as a regularization parameter to the machine learning algorithm; and
   applying, by the model training engine, the machine learning algorithm to the bag-of-words-based set of predictors to produce the surrogate machine learning model.

4. The method of claim 1, wherein selecting the value for the penalty parameter comprises receiving a predefined value for the penalty parameter.

5. The method claim 1, wherein selecting the value for the penalty parameter includes:
   training the first surrogate machine learning model using a first penalty parameter to achieve a first level of accuracy;
   training the second surrogate machine learning model using a second penalty parameter to achieve a second level of accuracy for the second surrogate machine learning model;
   identifying a set of most-influential tokens for the first surrogate machine learning model;
   identifying a set of most-influential tokens for the second surrogate machine learning model;

comparing the set of most-influential tokens for the first surrogate machine learning model to the set of most-influential tokens for the second surrogate machine learning model; and selecting, based on the comparison, the first penalty parameter or the second penalty parameter as the value for the penalty parameter.

6. The method of claim 1,
wherein the surrogate machine learning model comprises a support vector machine, and
wherein identifying the set of most-influential tokens includes:
generating, by the interpreter and from the support vector machine, coefficient estimates for each token in the set of text data, and
selecting, by the interpreter, a number of tokens having the highest coefficient estimates.

7. The method of claim 1,
wherein the surrogate machine learning model comprises an extreme gradient boosted model, and
wherein identifying the set of most-influential tokens includes:
generating, by the interpreter and from the extreme gradient boosted model, aggregated Shapley additive explanations (SHAP) value estimates for each token in the set of text data, and
selecting, by the interpreter, a number of tokens having highest aggregated SHAP value estimates.

8. The method of claim 1, further comprising:
outputting, by the communications circuitry, the set of most-influential tokens in the set of text data as an approximated set of most-influential tokens in the set of text data for the NLP machine learning model.

9. An apparatus for distillation of a natural language processing (NLP) machine learning model, the apparatus comprising:
communications circuitry configured to receive a set of text data comprising a set of observations;
processing circuitry configured to predict, using the NLP machine learning model, classifications for each observation in the set of text data;
a model training engine configured to:
generate a balanced sampled data structure based on the predicted classifications for each observation in the set of text data,
select a value for a penalty parameter based on a comparison between outputs from a first surrogate machine learning model and a second surrogate machine learning model, and
train a surrogate machine learning model using the balanced sampled data structure and the value for the penalty parameter; and
an interpreter configured to identify, from the surrogate machine learning model, a set of most-influential tokens in the set of text data.

10. The apparatus of claim 9, wherein the model training engine is configured to generate the balanced sampled data structure by:
identifying all observations in the set of text data having a first predicted classification;
identifying a similar number of observations in the set of text data having a second predicted classification; and
generating the balanced sampled data structure by compiling:
text comprising each identified observation having the first predicted classification,
text comprising each identified observation having the second predicted classification, and
for the text comprising each identified observation, a label identifying its predicted classification label.

11. The apparatus of claim 9, wherein the model training engine is configured to train the surrogate machine learning model using the balanced sampled data structure and the value for the penalty parameter by:
applying one-hot encoding to convert the balanced sampled data structure into a bag-of-words-based set of predictors;
selecting a machine learning algorithm for training;
adding the value of the penalty parameter as a regularization parameter to the machine learning algorithm; and
applying the machine learning algorithm to the bag-of-words-based set of predictors to produce the surrogate machine learning model.

12. The apparatus of claim 9, wherein selecting the value for the penalty parameter comprises receiving a predefined value for the penalty parameter.

13. The apparatus of claim 9, wherein selecting the value for the penalty parameter includes:
training the first surrogate machine learning model using a first penalty parameter to achieve a first level of accuracy;
training the second surrogate machine learning model using a second penalty parameter to achieve a second level of accuracy for the second surrogate machine learning model;
identifying a set of most-influential tokens for the first surrogate machine learning model;
identifying a set of most-influential tokens for the second surrogate machine learning model;
comparing the set of most-influential tokens for the first surrogate machine learning model to the second surrogate machine learning, model; and
selecting, based on the comparison, the first penalty parameter or the second penalty parameter as the value for the penalty parameter.

14. The apparatus of claim 9,
wherein the surrogate machine learning model comprises a support vector machine, and
wherein the interpreter is configured to identify the set of most-influential tokens by:
generating, from the support vector machine, coefficient estimates for each token in the set of text data, and
selecting a number of tokens having the highest coefficient estimates.

15. The apparatus of claim 9,
wherein the surrogate machine learning model comprises an extreme gradient boosted model, and
wherein the interpreter is configured to identify the set of most-influential tokens by:
generating, from the extreme gradient boosted model, aggregated Shapley additive explanations (SHAP) value estimates for each token in the set of text data, and
selecting a number of tokens having highest aggregated SHAP value estimates.

16. The apparatus of claim 9, wherein the communications circuitry is further configured to:
output the set of most-influential tokens in the set of text data as an approximated set of most-influential tokens in the set of text data for the NLP machine learning model.

17. A computer program product for distillation of a natural language processing (NLP) machine learning model, the computer program product comprising at least one non-transitory computer-readable storage medium storing software instructions that, when executed, cause an apparatus to:
- receive a set of text data comprising a set of observations;
- predict, using the NLP machine learning model, classifications for each observation in the set of text data;
- select a value for a penalty parameter based on a comparison between outputs from a first surrogate machine learning model and a second surrogate machine learning model;
- generate a balanced sampled data structure based on the predicted classifications for each observation in the set of text data;
- train a surrogate machine learning model using the balanced sampled data structure and the value for the penalty parameter; and
- identify, from the surrogate machine learning model, a set of most-influential tokens in the set of text data.

18. The computer program product of claim 17, wherein the software instructions, when executed, further cause the apparatus to:
- output the set of most-influential tokens in the set of text data as an approximated set of most-influential tokens in the set of text data for the NLP machine learning model.

19. The computer program product of claim 17, wherein the software instructions, when executed, further cause the apparatus to train the surrogate machine learning model using the balanced sampled data structure and the value for the penalty parameter by:
- applying one-hot encoding to convert the balanced sampled data structure into a bag-of-words-based set of predictors;
- selecting a machine learning algorithm for training;
- adding the value of the penalty parameter as a regularization parameter to the machine learning algorithm; and
- applying the machine learning algorithm to the bag-of-words-based set of predictors to produce the surrogate machine learning model.

20. The computer program product of claim 17, wherein the software instructions, when executed, further cause the apparatus to:
- train the first surrogate machine learning model using a first penalty parameter to achieve a first level of accuracy;
- train the second surrogate machine learning model using a second penalty parameter to achieve a second level of accuracy for the second surrogate machine learning model;
- identify a set of most-influential tokens for the first surrogate machine learning model;
- identify a set of most-influential tokens for the second surrogate machine learning model;
- compare the set of most-influential tokens for the first surrogate machine learning model to the set of most-influential tokens for the second surrogate machine learning model; and
- select, based on the comparison, the first penalty parameter or the second penalty parameter as the value for the penalty parameter.

\* \* \* \* \*

UNITED STATES PATENT AND TRADEMARK OFFICE
CERTIFICATE OF CORRECTION

PATENT NO. : 12,019,987 B1  
APPLICATION NO. : 17/302261  
DATED : June 25, 2024  
INVENTOR(S) : Ye Yu et al.

Page 1 of 1

It is certified that error appears in the above-identified patent and that said Letters Patent is hereby corrected as shown below:

In the Claims

In Column 20, Line 40 (Claim 3), delete the second assurance of "applying,"

Signed and Sealed this  
Second Day of September, 2025

Coke Morgan Stewart  
*Acting Director of the United States Patent and Trademark Office*